US005296670A

United States Patent [19]

Dorfman et al.

[11] Patent Number: 5,296,670

[45] Date of Patent: Mar. 22, 1994

[54] DC PLASMA ARC GENERATOR WITH EROSION CONTROL AND METHOD OF OPERATION

[75] Inventors: Leonid P. Dorfman, Athens; Sanjay Sampath, Sayre; Michael J. Scheithauer, Ulster; Jack E. Vanderpool, Laceyville, all of Pa.

[73] Assignee: Osram Sylvania Inc., Danvers, Mass.

[21] Appl. No.: 999,642

[22] Filed: Dec. 31, 1992

[51] Int. Cl.[5] .......... B23K 9/00

[52] U.S. Cl. .......... 219/121.52; 219/121.51; 219/121.48; 219/121.5

[58] Field of Search .......... 219/121.52, 121.51, 219/75, 121.48, 121.5; 313/231.31, 231.41

[56] References Cited

U.S. PATENT DOCUMENTS

| | | | |
|---|---|---|---|
| 3,869,593 | 3/1975 | New et al. | 219/121.52 |
| 4,535,225 | 8/1985 | Wolf et al. | 219/121.52 |
| 4,620,080 | 10/1986 | Arata et al. | 219/121.51 |
| 4,656,330 | 4/1987 | Poole | 219/121.52 |
| 4,764,656 | 8/1988 | Browning | 219/121.52 |
| 4,788,408 | 11/1988 | Wlodarczyk et al. | 219/121.49 |

*Primary Examiner*—Mark H. Paschall

*Attorney, Agent, or Firm*—Robert F. Clark

[57] ABSTRACT

A DC plasma arc generator and method of operation including a generally cylindrical anode divided into an arc constricting portion and an exit portion lined with refractory liners and having critical dimensions and spacing to allow introduction of vortical gas flows and stabilization of the primary arc thereby, reducing degradation and erosion of the generator.

15 Claims, 1 Drawing Sheet

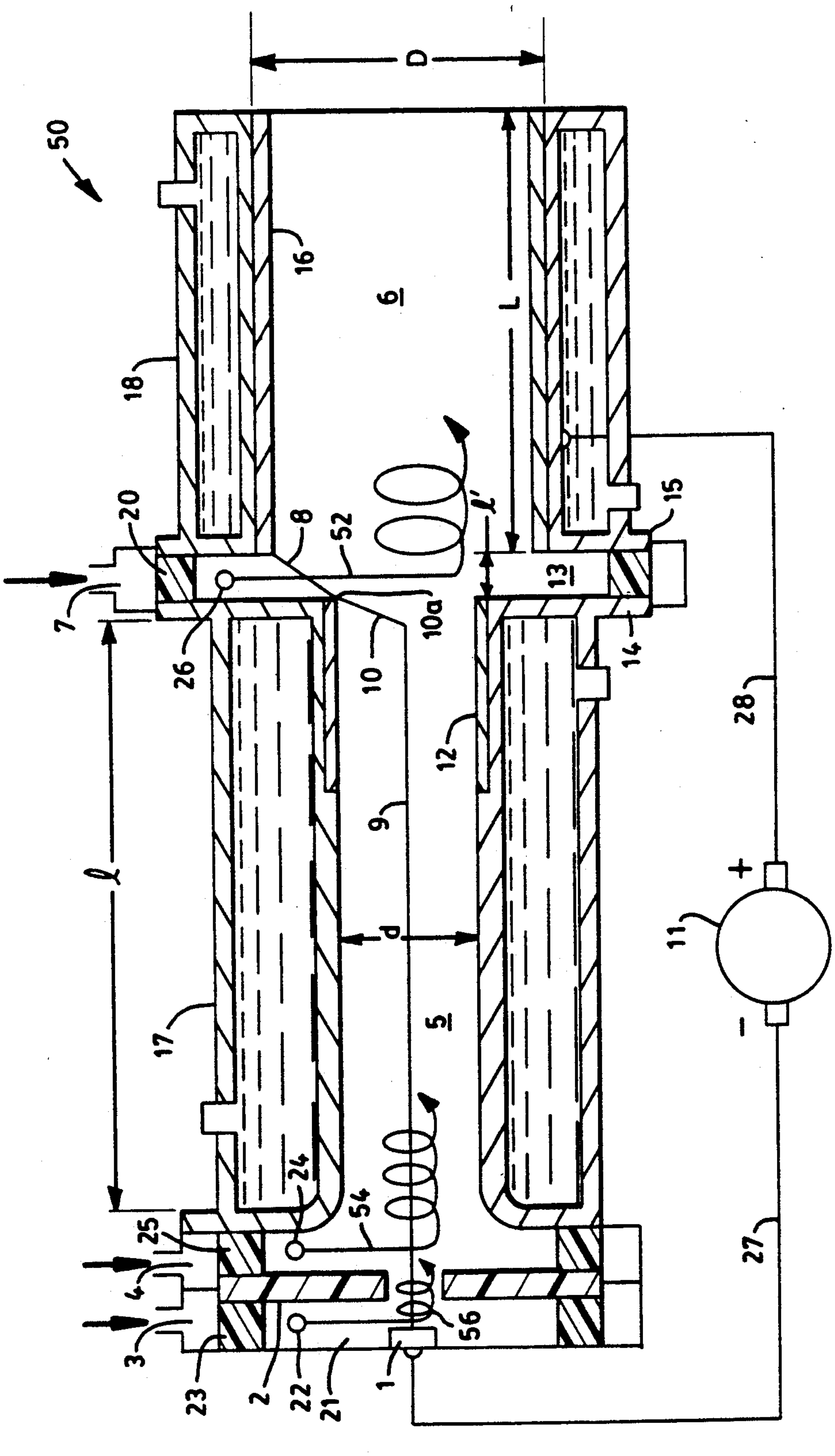
D
50
16
6
L
18
20
8
52
15
7
26
10a
10
14
28
12
9
l
d
5
11
+
−
17
24
54
25
4
27
3
56
23
2
22
21
1

DC PLASMA ARC GENERATOR WITH EROSION CONTROL AND METHOD OF OPERATION

RELATION TO OTHER APPLICATIONS

This invention relates to our copending application Docket No. 922163, Ser. No. 07/999,623, filed concurrently herewith.

BACKGROUND OF THE INVENTION

The present invention relates to DC plasma arc generators and particularly to a novel method and means for controlling the disposition and length of a vortex-stabilized DC plasma arc and extending the life of such generators by reducing pitting and erosion.

DESCRIPTION OF THE PRIOR ART

Vortex-stabilized DC plasma arc generators are well known to the art. Dynamic gas conditions and current levels greatly affect the length of a vortex-stabilized arc in plasma generators with self-establishing arc lengths. To attach an arc to a hollow exit electrode, a vortex-stabilized, axially-positioned DC arc must bend and form a finger, that is, a conducting radial path at an angle to the axis of the plasma gas flow which attaches to the exit electrode. Being strongly affected by the axial flow of the gas, the finger constantly changes its spot of attachment. The movement of the arc has a lagging or sometimes jumping effect relative to the vortical velocity of the gas flow due to drag forces and localized hot spots and pitting which occur when the arc is in longer residence at one spot than in another. As pitting increases the arc will eventually attach to a single spot and can destroy the generator.

An efficient way to stabilize a plasma arc is the use of tangential injection of the plasma gas into the arc chamber. A vortex is created which provides collimation, constriction and directional stabilization of the arc. By controlling the gas flow rate the arc can be blown out of the nozzle and attached to the nozzle exterior, or the arc attachment can be kept within the nozzle. Such arc attachment to a hollow exit electrode seriously hinders the injection of material into the plasma flame through the walls of the electrode. Materials should be injected below, or downstream of, the arc attachment to the wall of the nozzle. However, it is very difficult to control the site of arc attachment through gas dynamics especially under the complications caused by erosion of the nozzle. Thus, the prevention of nozzle erosion is not just a matter of extending the life of the generator but rather is a design demand to satisfy two conflicting requirements, arc attachment and material injection.

SUMMARY OF THE INVENTION

Selection of appropriate materials for the construction of a dual arc, vortex-stabilized generator can extend the life of the generator by reducing erosion substantially while also allowing for a substantial reduction in the velocity of the gases used to induce the vortex. According to the present invention the anode of a plasma generator is divided into two portions: a constricting portion and an exit portion. These portions are separated from one another along the plane of a step at the distal end of the constricting portion and the exit portion. The ends of the two portions are provided with flanges that face each other and can withstand electrical arcing between them. A gas injection port is provided in the constricting portion and between the flanges for tangential introduction of gas to provide vortical gas flows which are tangential to each other and which intersect. Only the exit portion of the anode, and a cathode disposed at the proximal end of the generator, are directly connected to the corresponding terminals of a DC power supply. The cathode is electrically insulated from the rest of the generator also.

According to the invention, the cathode is formed of refractory metals such as tungsten, molybdenum, tantalum, niobium, and zirconium doped with a minor amount (between about 0.5 and 3 wt. %) of emissive material such as thoria or yttria. Since the distal end of the constricting portion of the generator serves as a cathode with respect to the proximal end of the exit portion, the same doped refractory metals may be used as a liner. Since the exit portion has no requirement to emit electrons, the refractory metals, undoped, may be successfully used as its liner. Additionally, copper-infiltrated tungsten provides an excellent anode material since it combines the high melting point of tungsten with the thermal conductivity of copper.

According to the invention, the length of a vortex-stabilized plasma arc of a substantial length, one inch or longer, may be controlled. The method and device of the present invention disrupts the stiff attachment of a plasma arc to the hollow exit electrode, and a simple mechanism is provided for rotating the arc attachment along the hollow exit electrode and reducing erosion of the generator. The invention provides for a designated area of arc attachment upstream of the area where material is injected into the hottest zone of the plasma flame through feed ports in the exit step.

According to the invention, there is provided a DC plasma arc generator which includes a cathode and a generally cylindrical exit portion anode together with a generally cylindrical constricting portion disposed between them, each of the elements being electrically insulated from the other. The distal end of the constricting portion is spaced from the proximal end of the exit portion by a predetermined distance, and the inner diameter of the exit portion is greater than the inner diameter of the constricting portion. There is provided a means to introduce tangentially a first stream of a vortex-generating gas adjacent the proximal end of the constricting portion and a means to introduce tangentially a second stream of a vortex-generating gas in the space between the distal end of the constricting portion and the proximal end of the exit portion. The space provides a locality for forming a short arc. A main arc is formed between the cathode and the distal end of the constricting portion. A flange is disposed at the distal end of the constricting portion and another is disposed at the proximal end of the exit portion. The flanges are arranged in a face-to-face relationship with each other. According to the invention, the inner diameter of the exit portion is 1.1 to 1.5 times, and preferably 1.15 to 1.3 times, greater than the inner diameter of the constricting portion. The space between the flanges is between about 0.03 and 0.15 times, and preferably between about 0.05 and 0.08 times, the length of the exit portion, and the length of the exit portion is 0.5 to 4 times its diameter. The length of the constricting portion is 3 to 10 times its diameter.

That the gas swirl in the space between the flanges generates a vortical flow of ionized gas. The swirling ionized gas facilitates attachment of the main arc to a designated area of the constricted portion. The spinning gases stabilize the long arc by exchanging ions and control its length by rotating the radial arc finger along the primary site of its attachment to the distal end of the constricting portion. The arc attachment location is more easily moved, thereby reducing generator erosion.

BRIEF DESCRIPTION OF THE DRAWING

The single figure is a cross-sectional view of a DC arc generator according to the present invention.

DESCRIPTION OF THE PREFERRED EMBODIMENT

The arc generator 50 is formed of a hollow cylindrical constricting portion 5 and a hollow cylindrical exit portion 6. The constricting portion 5 and the exit portion 6 are separated from each other by a space 13 of predetermined width. The space 13 is formed between the distal end of the constricting portion 5 and the proximal end of the exit portion 6. A pair of flanges 14 and 15 spaced from each other and located at the distal end of the constricting portion 5 and the proximal end of the exit portion 6 define the space 13 which will support a radio frequency (RF) arc across it. A gas injection slot 7 is disposed between the flanges 14 and 15 and is arranged to tangentially inject gas 52 to generate a vortical gas flow which tangentially intersects a vortical flow of gas 54 from the constricting portion. The constricting portion 5 may be insulated from the exit portion 6 by a ceramic ring 20, commonly made from alumina, zirconia or beryllia.

At the proximal end of the arc generator 50 a cathode 1 is connected by a cable 27 to the negative side of a DC power supply 11. The composition of the cathode 1 is of refractory metal doped with a minor amount of an emissive material such as thoria or yttria. The positive side of the power supply 11 is connected by a cable 28 to the exit portion 6. A high RF (0.1 to 2 MHz) voltage is needed to ignite the DC arc. This voltage is momentarily applied to the cathode 1 and the anode 6. A small flow of inert gas 56 such as argon, nitrogen or helium may be introduced into a manifold 3 to protect the cathode 1 from chemical erosion of reactive plasma gases. The gas 56 is distributed tangentially into the cathode area 21 through holes 22 formed in a ceramic ring 23 of material. Working gas 54 may be introduced through a manifold 4 and distributed tangentially into the cathode area 21 through holes 24 formed in a ceramic ring 25. Such working gases may include inert gases such as nitrogen, argon, helium, or reactive gases such as hydrogen, air, oxygen, carbon monoxide or hydrocarbons. The arrangement of such gases and the means for their introduction is well known to the art. Gases 56 and 54 introduced through manifolds 3 and 4, respectively, enter the constricting portion 5 in a spiralling gas flow in a plane which is normal to the axis of the vortex-generating ceramic rings 23, 25, as shown in the drawing as a swirl. The gas flow spirals through the constricting portion 5 and moves toward the exit portion 6.

Additional working gases 52 are introduced through the manifold 7. The gas 52 is distributed tangentially into the space 13 through holes 26 formed in a ceramic ring 20. The gas introduced through manifold 7 may be identical to the gas introduced through manifold 4 and it too spirals inwardly as it enters the space 13 between the flanges 14 and 15. The spiralling flow has a linear component of motion perpendicular to the axis of the vortex-generating ceramic ring 20. The linear component of both gas flows facilitates the intersection and mixing of the gas flows, while the tangential component of both gas flows stabilizes the main arc 9 and forces it to rotate. The gas flow also forces the arc 9 to spin at its attachment point 10*a* to the constricting portion 5. The injection point of gas entering holes 26 is at the step where the swirling gases from constricting portion 5 suddenly expand in volume and therefore diameter.

To provide for the swirling of the arc 9 and the attachment of a finger 10 to the distal end of the constricting portion 5, certain requirements must be met in the construction of the arc generator 50. The inner diameter (D) of the exit portion 6 must be 1.1 to 1.5 times, and preferably 1.15 to 1.3 times, greater than the inner diameter (d) of the constricting portion 5. Moreover, the space (1') between the flanges 14 and 15 must be between about 0.03 and 0.15 times, and preferably between 0.05 and 0.8 times, the length (L) of the exit portion 6. The length (L) of the exit portion 6 is 0.5 to 4 times its diameter (D). The length (1) of the constricting portion 5 must be 3 to 10 times its diameter (d).

The high RF (0.1 to 2 MHz) voltage needed to ignite the DC arc 9 is momentarily applied to the electrodes via cables 27 and 28. In the presence of all gases injected through manifolds 3, 4 and 7 the RF discharge takes a path of least resistance in the form of two RF discharges in series, that is, a first arc 9 between the cathode 1 and the closest site of the arc constricting portion 5, and a second arc 8 between the two flanges 14 and 15. The DC arc 9 initially follows the ionized gaseous path established by the RF discharge. At this moment two DC arcs 9 and 8 coexist, the longer arc 9 being between the cathode 1 and the distal end of the constricting portion 5 and the shorter arc 8 being across the space 13 between the two flanges 14 and 15.

The flow of gases introduced through manifolds 3 and 4, and the low pressure inside the anode 6 due to the tangential injection of gases, forces the arc 9 to stretch by moving its attachment point 10*a* down the interior wall of the constricting portion 5 toward its distal end and the space 13 between the flanges 14 and 15.

The space 13 limits movement of the radial attachment of the finger 10 of the main arc 9 because the space 13 between the flanges 14 and 15 remains shielded by dynamic gas flow from the main flow of the gas within the constricting portion 5. The gas 52 injected tangentially into the space 13 becomes ionized due to arcing 8 across the space 13 between the flanges 14 and 15. This arcing forms a constantly ionized vortical flow which is normal to the plane of the main flow of the gases 56 and 54 from manifolds 3 and 4, respectively. The stretch of arc 9 increases the arc voltage drop and ionizes the vortical flow of working gas. Both ionized vortical gas flows constantly intersect and remain in electrical contact by the interchanging of ions. This prevents disruption of the electrical circuit during stretching of the arc 9. Under the above conditions for constant completion of the DC electric circuit due to arcing across the space 13, the movement of the attached finger 10 of the arc 9 is limited by the length 1 of the arc constricting portion 5. At this length the arc 9 attains its highest possible voltage.

The DC electric circuit now includes a fully developed arc 9 of length 1 in series with an arc 8 of length 1' between the constricting portion 5 and the exit portion 6, both arcs being supported by the DC power supply 11. The two intersecting vortical flows of ionized gases electrodynamically stabilize the main arc 9 in the area 10a of the arc attachment to the constricting portion 5. Stabilization is achieved by exchanging ions and rotating the arc attachment 10a along the distal end of the interelectrode 5, thereby controlling the length of the main arc 9.

In the above arc generator, the constricting portion 5 and the exit portion 6 are cooled by means of water jackets 17 and 18 as is conventional in the art. The cathode 1 is made out of tungsten doped with 2% thoria and is mounted in the center of a cathode holder by conventional means such as brazing, pressing or threaded connections. The gases which are injected into the generator 50 are forced through injectors, as is conventional. Ceramic rings 20, 23, 25 have several equally-spaced tangential holes which are adjusted to provide the gas flow rate to generate incoming gas at below sonic tangential velocities.

The liner 12 for the arc constricting portion 5 of the anode is made out of tungsten, molybdenum, zirconium, or other suitable refractory metal doped with minor quantities of an emissive material. Tungsten doped with 2% thoria is the preferred material for this liner. The length of the liner 12 is equal to 10 to 50% of the length of the arc constricting portion 5. The wall thickness of the liner 12 is equal to 30 to 50% of the copper wall thickness surrounding the liner. The inside diameter of the liner 12 is equal to the inside diameter of the constricting portion 5 at the proximal end of the constricting portion and is installed flush with the distal end of the constricting portion 5.

The liner 16 for the exit portion 6 of the anode is made out of tungsten, molybdenum, zirconium, or other suitable refractory metal and may be infiltrated with 10 to 40% copper or other metal with a high thermal conductivity. Tungsten infiltrated with 10 to 40% copper is the preferred material for this liner. The length of the liner 16 is equal to the length of the exit portion 6 of the anode. The wall thickness of the liner 16 is equal to between 1 and 2 times the wall thicknesses of the liner 12 for the arc constricting portion 5 of the anode. The liner 16 is installed flush with the proximal end of the exit portion 16.

EXAMPLE

The following specific example is considered to be illustrative of operational methods of the invention.

A double-arc plasma generator of the following dimensions, in which the length of the arc is controlled by dynamic gas flow, was constructed.

d=0.550"
d=3.863
l/d=2.125"
L=0.073
l'=0.155"
D/d=1.163
D=0.640"
L/D=2.15
L=1.375"

The cathode was made of W-2% thoria. The anodes were made out of grade OFHC copper. The liner for the arc constricting portion of the anode was made out of W-2% thoria. Its length was 1" which was equal to 47% of the length of the copper electrode. The wall thickness of the liner was 0.0625" which was equal to 40% of the wall thickness of the copper electrode surrounding the liner. The liner for the exit step of the anode was made out of W-10.8% Cu. It had the same wall thickness as the above liner, and its length was equal to the length of the exit step of the anode. The actual inside diameters of the liners (D and d) are specified above. Both liners were installed into copper electrodes so that their arcing edges were flush with the mating surfaces of the anodes. Vacuum brazing with the aid of Ag-Cu-Ti active brazing alloys was used to join the liners with the copper electrodes.

An industrial DC power supply with 100% rated load of 88 kw at 1100 amps and 80 volts was used to feed the generator. The power supply had falling volt-ampere characteristics. It had an open circuit voltage of about 160 volts and could support a voltage of about 125 to 130 volts in the range of 200 to 700 amps. An industrial spark-gap oscillator was used to start the DC arc via an RF discharge. The oscillator generated 4000 volts at a frequency of about 1 to 2 MHz.

Although reactive working gases were not used, a flow of 25 standard cubic feet per hour (scfh) of argon was used to simulate the cathode protection; this gas also acted as a plasma gas component. The working gas composition consisted of 125 scfh argon and 70 scfh nitrogen. Due to the presence of liners, only 50% of the argon gas flow was used for fixation of the arc length compared to the operation without liners. This flow has been reduced from 120 scfh (operation without liners) to 60 scfh (operation with liners).

Correspondingly, the incoming tangential velocity of this gas was lowered from about sonic to about 0.5 sonic. The overall composition of the plasma gas allowed the plasma generator to operate at a point of stable arc operation of the power supply volt-ampere curve at 130 volts, 600 amps, and 78 kW (88.6% of the power supply capacity).

The torch was tested for 200 hours at the above conditions and no drift in arc voltage or current was observed during the test. This served as an indication of good control of the length of the primary arc and attachment of both arcs by our method.

After the test the torch components were examined. The arcing edges of the liner exhibited very insignificant erosion due to attachment of the arcs. The uniformity of the erosion along the arcing surfaces indicated that the arcs were properly attached and rotated by the dynamic gas forces according to the method. There was no pitting on the mating surfaces of the anodes; they were not touched by arcing. For practical purposes of continued torch operation, the electrodes with liners were in excellent condition and could continue their service for many more hours.

While there have been described particular embodiments of our invention and disclosed practical operating figures and dimensions, the invention is intended to include all variations and modifications within the spirit and scope of the present following claims.

We claim:

1. A DC plasma arc generator comprising: a generally cylindrical anode, said anode being divided into two portions, an arc constricting portion and an exit portion, said portions being coaxial with each other and each having distal and proximal ends, the distal end of said constricting portion being spaced from the proximal end of said exit portion by a predetermined distance, the inner diameter of said exit portion being greater than the inner diameter of said constricting portion, said constricting portion being electrically insulated from said exit portion prior to arc ignition;

refractory metal liners being disposed on at least said distal end of said constricting portion and said proximal end of said exit portion;

a cathode disposed adjacent said proximal end of said constricting portion and electrically insulated therefrom;

means to introduce tangentially a first stream of a vortex-generating gas adjacent said proximal end of said constricting portion adjacent said cathode;

means to introduce tangentially a second stream of a vortex-generating gas in the space between said distal end of said constricting portion and said promixal end of said exit portion;

means for establishing two arcs, one between said cathode and said distal end of said refractory metal liner in said constricting portion and the other between said distal end of said refractory metal liner in said constricting portion and said refractory metal liner in said promixal end of said exit portion, said two arcs sharing one common connection point, said common connection point of said two arcs being rotated by said second stream of a vortex-generating gas to reduce erosion within said generator.

2. The arc generator according to claim 1 further including a pair of opposing flanges, one flange being disposed at said distal end of said constricting portion and the other flange being disposed at said proximal end of said exit portion, said flanges being arranged in a face-to-face relationship with each other.

3. The arc generator according to claim 1 wherein a power supply is connected solely between said cathode and said exit portion of said anode.

4. The arc generator of claim 1 wherein the inner diameter of said exit portion is 1.1 to 1.5 times greater than said inner diameter of said constricting portion.

5. The arc generator of claim 1 wherein the length of said predetermined distance is between 0.03 and 0.15 times the length of said exit portion.

6. The arc generator of claim 1 wherein the length of said exit portion is 0.5 to 4 times its diameter.

7. The arc generator of claim 1 wherein the length of said constricting portion is 3 to 10 times its diameter.

8. The arc generator according to claim 1 wherein said refractory metal liner in said constricting portion is formed of a refractory metal doped with a minor amount of an emissive material.

9. The arc generator according to claim 8 wherein said refractory metal liner comprises a metal selected from the group consisting of tungsten, molybdenum, tantalum, niobium, and zirconium, and wherein said emissive material is thoria or yttria.

10. The arc generator according to claim 1 wherein said cathode is made from a refractory metal selected from the group consisting of tungsten, molybdenum, tantalum, niobium, and zirconium, wherein said refractory metal is doped with an emissive material comprising thoria or yttria.

11. The arc generator according to claim 1 wherein said liner in said exit portion is formed of a refractory metal infiltrated with 10 to 40 wt. % copper.

12. The arc generator according to claim 11 wherein said liner in said exit portion is formed of a refractory metal selected from the group consisting of tungsten, molybdenum, tantalum, niobium, and zirconium.

13. A method of operating a DC plasma arc generator, said generator having a cathode, a generally cylindrical anode divided into two portions, a constricting portion and an exit portion, said constricting portion and said exit portion each having distal and proximal ends, said cathode being disposed adjacent said proximal end of said constricting portion, said distal end of said constricting portion being spaced from said proximal end of said exit portion by 0.03 to 0.15 times the length of said exit portion, the length of said constricting portion being 3 to 10 times greater than its inner diameter, the inner diameter of said exit portion being 1.1 to 1.5 times greater then the inner diameter of said constricting portion, said exit portion having a length that is 0.5 to 4 times its diameter, said cathode, said constricting portion and said exit portion being electrically insulated from each other, prior to arc ignition, a refractory metal liner doped with emissive material being disposed within at least said distal end of said constricting portion and said proximal end of said exit portion, and a refractory metal liner disposed within at least said proximal end of said exit portion, said method comprising:

introducing tangentially a first stream of a vortex-generating gas adjacent said proximal end of said constricting portion to establish a vortical flow of said gas;

introducing tangentially a second stream of a vortex-generating gas into the space between said distal end of said constricting portion and said proximal end of said exit portion, said second stream intersecting said first stream;

imposing a potential between said cathode and said exit portion and forming a first arc between said cathode and said distal end of the refractory metal liner in said constricting portion and forming a second arc across the space between said distal end of said refractory metal liner in said constricting portion and said refractory metal liner in said proximal end of said exit portion, said first stream of gas forcing said first arc to revolve about the axis of the constricting portion, said first arc forming a finger which revolves about said distal end of said refractory metal liner in said constricting portion, said second arc forming between said liners at said distal and said proximal ends, respectively, of said constricting portion and said exit portion, said second arc ionizing the gas of the second stream and forcing said finger of said first arc to remain attached to said distal end of said constricting portion.

14. A method of operating a DC plasma arc generator, said generator having a cathode doped with an emissive material, and a generally cylindrical anode divided into two portions, a constricting portion and an exit portion, said constricting portion and said exit portion each having distal and proximal ends, said cathode being disposed adjacent said proximal end of said constricting portion, said distal end of said constricting portion being spaced a predetermined distance from said proximal end of said exit portion, the inner diameter of said exit portion being greater than the inner diameter of said constricting portion, said cathode, said constricting portion and said exit portion being electrically insulated from each other, prior to arc ignition, a refractory metal liner doped with emissive material being disposed within at least said distal end of said constricting portion and said proximal end of said exit portion, said method comprising:

introducing tangentially a first stream of a vortex-generating gas adjacent said proximal end of said constricting portion to establish a vortical flow of said gas;

introducing tangentially a second stream of a vortex-generating gas into the space between said distal end of said constricting portion and said proximal end of said exit portion, said second stream intersecting said first stream;

imposing a potential between said cathode and said exit portion and forming a first arc between said cathode and said distal end of said refractory metal liner in said constricting portion and forming a second arc in the space between said distal end of said refractory metal liner in said constricting portion and said refractory metal liner in said proximal portion of said exit portion, said first stream of gas forcing said first arc to revolve about the axis of said constricting portion, said first arc forming a finger which revolves about said distal end of said refractory metal liner in said constricting portion, said second arc forming between said liners at said distal and said proximal ends, respectively, of said constricting portion an said exit portion, said second arc ionizing the gas of said second stream and forcing said finger of said first arc to remain attached to said distal end of said constricting portion.

15. The method according to claim 14 wherein the diameter of said vortical flow in said exit portion is 1.1 to 1.5 times greater than the diameter of said vortical flow in said constricting portion.

* * * * *